Dec. 23, 1952 R. J. PETERSON 2,622,678
PROJECTILE VELOCITY MEASURING APPARATUS
Filed Aug. 17, 1951

INVENTOR.
ROBERT J. PETERSON
BY
McMorrow, Berman + Davidson
ATTORNEYS

Patented Dec. 23, 1952

2,622,678

UNITED STATES PATENT OFFICE 2,622,678

PROJECTILE VELOCITY MEASURING APPARATUS

Robert J. Peterson, National City, Calif.

Application August 17, 1951, Serial No. 242,324

3 Claims. (Cl. 161—18)

This invention relates to projectile velocity-measuring apparatus, and more particularly to apparatus for graphically indicating the speed of a projectile between two points a predetermined distance apart.

It is among the objects of the invention to provide improved apparatus for measuring and indicating the velocity of projectiles, such as rifle and pistol bullets, in flight; which measures the velocity electrically and gives an accurate indication of the velocity; which is easily portable and can be moved from place to place, if desired; which provides a means for quickly and easily computing the velocity in units of lineal measurement and time; which will accurately measure widely varying velocities; and which is simple and durable in construction, economical to manufacture, and easy to use.

Other objects and advantages will become apparent from a consideration of the following description and the appended claims in conjunction with the accompanying drawing, wherein:

Figures 1, 2, 3, 4:
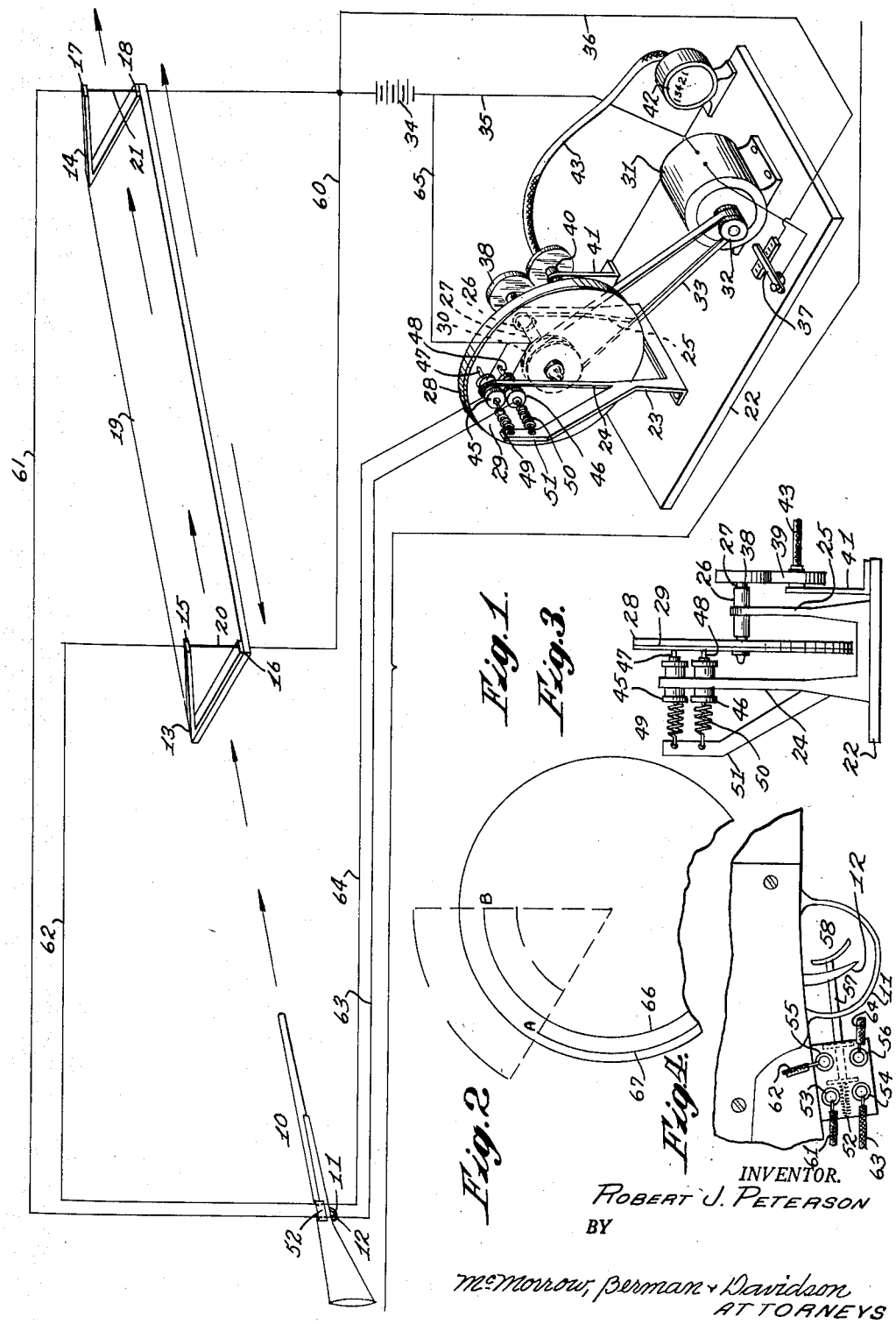
Figure 1 is a somewhat diagrammatic perspective view of velocity-measuring apparatus illustrative of the invention.
Figure 2 is a diagrammatic elevational view of a chart or graph sheet showing the manner in which the velocity is indicated thereon.
Figure 3 is an end elevational view of a sheet-supporting, moving and marking mechanism.
Figure 4 is a fragmentary elevational view showing a control switch mounted on a firearm.

With continued reference to the drawing, the apparatus includes a firearm 10, such as a rifle or pistol of known construction, having a trigger guard 11 and a trigger 12 disposed within the guard and manually operated to fire the arm, and also includes two brackets 13 and 14 spaced apart a predetermined distance along the path of travel of a projectile from the firearm 10. Each of the brackets has a pair of spaced apart terminal formations, as indicated at 15 and 16, for the bracket 13, and 17 and 18 for the bracket 14. The brackets are mounted on a suitable support 19 so that a predetermined distance will be accurately maintained between the terminal portions of one bracket and the terminal portions of the other bracket, and a frangible conductor 20 is secured at its ends to the terminal portions 15 and 16 of the bracket 13, and extends across the space between these terminal portions, while a frangible conductor 21 is secured at its ends to the terminal formations 17 and 18 of the bracket 14 and extends across the space between these formations. The frangible conductors 20 and 21 are disposed directly in the path of a projectile from the firearm 10 and are successively broken when a projectile is fired from the firearm.

A supporting base 22 is provided adjacent the brackets 13 and 14, and a supporting structure 23 is mounted at one end on the base 22 and extends upwardly therefrom. This structure 23 has two spaced apart and substantially vertically disposed arms or standards 24 and 25 and a bearing 6 is carried at the upper end of the standard 25. A shaft 27 is journaled in the bearing 26 and is disposed substantially parallel to the base 22. A disc 28 is concentrically mounted on the shaft 27 at one end of the latter and a body 29 of markable sheet material is carried on the face of the disc 28 remote from the standard 25. A belt pulley 30 is mounted on the shaft 27 adjacent the disc 28 and an electric motor 31 is mounted on the base 22 at a location spaced from the support structure 23 and carries on one end of its shaft a belt pulley 32 which is drivingly connected by a belt 33 with the belt pulley 30 on the shaft 27.

A source of electrical energy, such as a storage battery 34, is provided adjacent the base 22 and one side of this source of electrical energy is connected to the motor 31 through a conductor 35. The other side of the source of electrical energy is connected to the motor through a conductor 36 and rheostat 37 is interposed in the conductor 36 for regulating the speed of the motor.

A drive disc or gear 38 is mounted on the shaft 27 at the end thereof remote from the disc 28, and a complementary disc or gear 39 is mounted on a shaft 40 journaled in a bearing supported at the upper end of a standard 41 mounted on the base 22 adjacent the standard 25 of the support structure 23. A tachometer 42 is mounted on the base 22, and a flexible drive shaft 43 connects the disc or gear 39 to the tachometer to indicate the speed at which the disc 28 is driven by the motor 31.

A pair of solenoids 45 and 46 are mounted on the upper end of the standard 24 of the support structure 23 and are slightly spaced apart in a direction radially of the disc 28. The armatures of these solenoids are disposed substantially perpendicularly to the face of the disc 28 carrying the body 29 of sheet material and marking implements 47 and 48 are carried at the ends of the armatures of the solenoids 45 and 46, respectively adjacent the body 29 of sheet material, and engage and mark the surface of this body of sheet material when the solenoids are energized. Springs 49 and 50 are connected between the outer ends of the solenoid armatures and the upper end of an arm 51 extending outwardly from the standard 24 to move the marking implements 47 and 48 away from the body 29 of sheet material when the solenoids are deenergized. The energizing circuit for the solenoids includes a switch 52 mounted on the firearm adjacent the rear side of the trigger guard 11 and has two poles, each provided with two sides, as indicated at 53 and 54 for one pole of the switch, and 55 and 56 for the other pole of the switch. The switch plunger 57 extends past the rear side of the trigger guard and the trigger 12, and has an abutment formation 58 at its distal end, which abutment formation is movable by finger pressure and engages the trigger 12 to fire the firearm 10 at substantially the same time that the switch 52 is closed. Preferably, the abutment 58 is adjustable relative to the trigger, so that the switch is closed a very small increment of time before the arm is fired. The energizing circuit further includes a conductor 60 which connects one side of the battery 34 with one side each of both of the frangible conductors 20 and 21, a conductor 61 which connects one side of the frangible conductor 21 with the switch pole side 53, a conductor 62 which connects the other side of the frangible conductor 20 with the switch pole side 55, a conductor 63 which connects the switch pole side 54 with one side of the solenoid 46, a conductor 64 which connects the switch pole side 56 with one side of the solenoid 45, and a conductor 65 which connects the other side of both of the solenoids 45 and 46 with the other side of the battery 34.

When the switch 52 is closed it connects the switch pole side 53 to the switch pole side 54 and the switch pole side 55 to the switch pole side 56 thereby completing separate energizing circuits for the solenoids 45 and 46.

With this arrangement, when the disc 28 and body of sheet material 29 are rotated at a predetermined speed by the motor 31, and the switch 52 is closed and the firearm substantially simultaneously fired, both of the solenoids 45 and 46 are energized moving both of the marking implements 47 and 48 into marking engagement with the body 29 of sheet material. Two arcuate marks will now be made on the body of sheet material until the projectile breaks the first frangible conductor 20, deenergizing the solenoid 45 and permitting the spring 49 to instantly retract the marking implement 47. The implement 48 will remain in contact with the body of sheet material and continue its mark until the frangible conductor 21 is broken by the projectile, at which time the solenoid 46 will be deenergized and the spring 50 will retract the implement 48 from the body of sheet material.

The mark made by the implement 48, as indicated at 66 in Figure 2, is longer than the mark 67 made by the marking implement 47 by the distance extending from A to B. The portion of the mark 66 from A to B extends through a definite angle which can be easily determined if the sheet of material 29 is a piece of polar coordinate graph paper. With the rotational speed of the disc known, the time required for the disc to rotate through the angle A—B is readily determined, and with the distance between the frangible conductors 20 and 21 known and the interval of time required for the projectile to pass from the conductor 20 to the conductor 21 given by the time required for the disc to rotate through the angle A—B, the velocity of the projectile between the conductors 20 and 21 can be easily determined.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a firearm having a trigger, means for indicating the velocity of a projectile fired from the firearm comprising brackets spaced apart a predetermined distance along the path of travel of a projectile fired from the firearm and each having a pair of spaced apart terminal formations, frangible conductors secured one to each pair of terminal formations and each extending across the space between the corresponding pair of terminal formations, said frangible conductors being disposed directly in the path of a projectile fired from said firearm, a body of markable sheet material, means supporting said body of sheet material and moving it in a predetermined direction at a predetermined rate of speed, a pair of electrical solenoids disposed adjacent said body of sheet material in spaced apart relationship to each other, marking implements mounted one in each solenoid and engaging said body of resilient material once said solenoids are energized, resilient means connected to said solenoids holding said marking implements out of engagement with said body of sheet material when said solenoids are deenergized, and an energizing circuit for said solenoids including a source of electrical energy, a double-pole switch operated in conjunction with the operation of said trigger, a first conductor connecting one side of said source of electrical energy to both of said frangible conductors at one side of the latter, a second conductor connecting the other side of one of said frangible conductors to one pole of said switch, a third conductor connecting the other side of the other of said frangible conductors to the other pole of said switch, a fourth conductor connecting one pole of said switch to one side of one of said solenoids, a fifth conductor connecting the other pole of said switch to one side of the other of said solenoids, and a sixth conductor connecting the other sides of both solenoids to the other side of said source of electrical energy so that both solenoids are energized when said switch is closed in conjunction with the operation of said trigger to fire said firearm and are successively deenergized as said frangible conductors are broken by a projectile passing thereby causing said marking implements to make two marks of unequal length on the moving body of sheet material with the difference in the length of said marks indicating the velocity of a projectile between said frangible conductors.

2. In combination with a firearm having a trigger, means for indicating the velocity of a projectile fired from said firearm comprising frangible conductors spaced apart a predetermined distance along the path of travel of a projectile fired from said firearm, a body of material having a markable surface, means supporting said body and moving the latter at a predetermined speed, electric solenoids disposed adjacent the markable surface of said body of material, marking implements carried one by each solenoid and engaging the markable surface of said body of material when the corresponding solenoids are energized, resilient means connected to said solenoids and moving said marking implements away from said body of material when the corresponding solenoids are deenergized, a trigger-operated switch mounted on said firearm and closed when the arm is fired, and an energizing circuit for said solenoids including a source of electrical energy, conductor means connecting both of said solenoids to said source of electrical energy and conductor means connecting said solenoids respectively in series with said frangible conductors and with said switch to the other side of said source of electrical energy so that said solenoids will be simultaneously energized upon closing of said switch when said trigger is operated to fire the arm and will be successively deenergized as said frangible conductors are successively broken by a projectile fired from said firearm.

3. Apparatus for indicating the velocity of a projectile fired from a firearm comprising at least two frangible conductors mounted a predetermined distance apart and adapted to be successively broken by a projectile in flight, a body having a markable surface thereon, means supporting said body and moving it at a predetermined speed, at least two marking implements disposed adjacent said body, resilient means urging said marking implements to a non-indicating position relative to said markable surface, electric solenoids connected one to each marking implement and effective when energized to move the corresponding marking implements to an indicating position relative to said markable surface, a source of electrical energy, an energizing circuit connecting said solenoids and said frangible conductors in series with said source of electrical energy with each solenoid in series with one frangible conductor only and the series connected solenoid and frangible conductor assemblies in parallel with each other, and a manually operated switch in series with both of said solenoids and said source of electrical energy for limiting the period of energization of said solenoids to a brief interval of time extending over the firing of an associated firearm.

ROBERT J. PETERSON.

REFERENCES CITED

The following references are of record in the file of this patent:

UNITED STATES PATENTS

| Number | Name | Date |
|---|---|---|
| 1,489,566 | Webster | Apr. 8, 1924 |
| 2,146,820 | Haselwood | Feb. 14, 1939 |
| 2,583,737 | Hoffman et al. | Jan. 29, 1952 |